(No Model.)
S. H. SHORT.
ARMATURE FOR DYNAMO ELECTRIC MACHINES.
No. 473,364. Patented Apr. 19, 1892.
FIG. I.
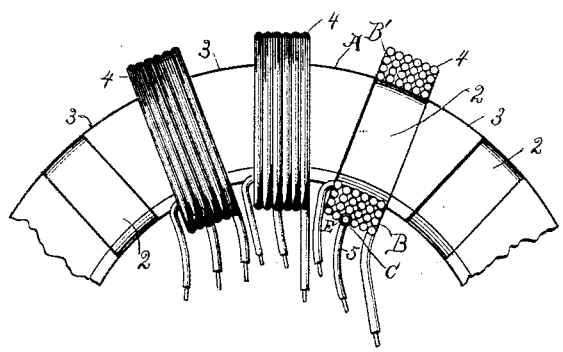
FIG. II.
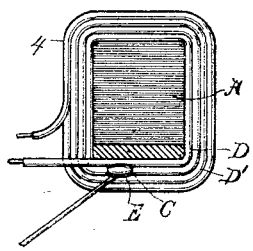
FIG. III.
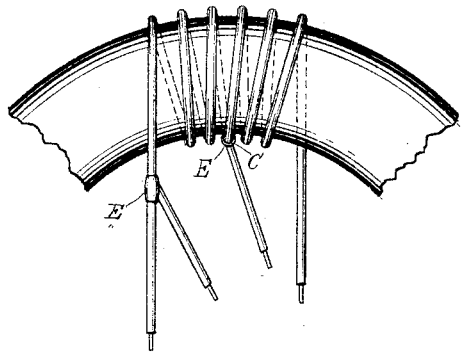
FIG. IV.
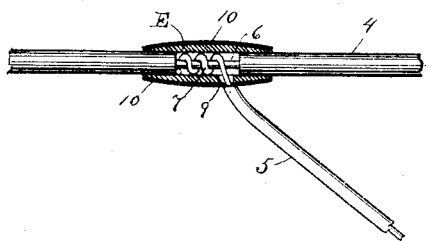
FIG. V.
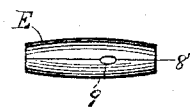
Witnesses
R. E. Auld.
G. F. Downing.
Inventor
Sidney H. Short
By H. A. Seymour
atty.

UNITED STATES PATENT OFFICE.

SIDNEY H. SHORT, OF CLEVELAND, OHIO.

ARMATURE FOR DYNAMO-ELECTRIC MACHINES.

SPECIFICATION forming part of Letters Patent No. 473,364, dated April 19, 1892.

Application filed June 19, 1891. Serial No. 396,820. (No model.)

*To all whom it may concern:*

Be it known that I, SIDNEY H. SHORT, of Cleveland, in the county of Cuyahoga and State of Ohio, have invented certain new and useful Improvements in Armature Construction for Dynamo-Electric Machines; and I do hereby declare the following to be a full, clear, and exact description of the invention, such as will enable others skilled in the art to which it appertains to make and use the same.

This invention relates to the construction of armatures for dynamo-electric machines for use as generators or as motors, and has more particular reference to the armatures in which the bobbins of insulated wire are wound on the armature-core between teeth or separators, although it is at least in part applicable to close-wound armatures.

It will be understood that each of the improvements constituting the said invention is included for all the uses to which it may be adapted.

In the manufacture of toothed armatures it has ordinarily been the practice to connect the ends of the coils between teeth with adjacent bars of the commutator, so that one bobbin is placed in each of the bobbin-spaces. In accordance with the present invention the coil is connected at one or more intermediate places with one or more intervening commutator-bars, so that there are two (or it may be more) bobbins in each bobbin-space, which bobbins are separated from each other by a radial division. To effect this, the wire coils are kept at one end of the bobbin-space until the requisite portion thereof is full, and then a further section is wound on commencing with the inside and proceeding to the periphery, as before. The connection of the bobbin-wire at the intermediate places with appropriate commutator-bars is best effected by means of branch conductors united to the bobbin-wire by joints which lie flat, and therefore do not interfere with the continuous winding on of the said bobbin-wire. For this purpose the bobbin-wire is bared at a selected place and the end of the branch conductor is laid upon the bobbin-wire and is bound firmly thereto, so as to form a sort of Y or T, which leaves the bobbin-wire practically the same as if it had been wound on without the attachment of the branch wire. Branch wires so coupled or joined may be used between the bobbins of close-wound (Gramme type) armatures to form the commutator connections. To form a suitable flat-lying joint, the bared end of the branch conductor is wrapped about the bared place on the bobbin-wire and is inclosed in a split sleeve of conducting material—say copper—which sleeve and the two conductors are then soldered together. The branch conductor passes out through a hole in the side of the sleeve and the latter is firmly bound with tape or similar binding. This construction of joint constitutes a special feature of invention and is included, generally, in the invention as well as in connection with the armature-bobbins and branch conductors leading to the commutator-bars of a dynamo-electric machine.

In the accompanying drawings, which form part of this specification, Figure I is a partial face view of an armature, illustrating the construction of a toothed armature in accordance with the invention, having two bobbins radially divided to a bobbin-space. Fig. II is a sectional view of an armature, illustrating a peripherical division of the bobbins. Fig. III is a partial face view of a close-wound armature. Fig. IV is a sectional view illustrating the construction of the joint, and Fig. V is a side view of the split sleeve detached.

The armature-core A, Figs. I and II, is shown as made up of a soft-iron ribbon wound upon a foundation-ring and milled with slots 2 in the edges to receive the bobbins. The teeth 3 are formed by the intervening metal between the slots 2. A solid toothed core could be used, the present invention having no special relation to the nature of the core, whether laminated or similarly constructed or solid. The bobbin-wire 4 is wound in a slot 2, taking care to keep it at one end until the bobbin B is formed. The branch conductor 5 is then applied and the wrapping on of the bobbin-wire is continued to form the bobbin B', the division between it and the bobbin B being radial, (or, in other words, in or nearly in a plane through the axis of the armature.) The joint between the bobbin-wire 4 and the branch conductor 5 is formed by baring the bobbin-wire, as at 6 in Fig. IV, laying the bared end 7 of the branch conductor upon and wrapping it about the bobbin-wire at 6. Then the copper sleeve E, split at 8, is placed over the joint, the branch conductor passing out through the hole 9 in said sleeve. The sleeve, the branch conductor, and the bobbin-wire are next soldered together, and, finally, a wrapping of tape 10 is applied. This joint is indicated at C in Figs. I, II, and III. When it has been made, the winding on of the bobbin-wire is continued practically as if no joint had been made. The branch conductor 5 is led to a commutator-bar (not shown) and is secured thereto in any ordinary or suitable way. Similar conductors may be led from the bobbin-wire as it passes from one bobbin-space to the next, or any known or suitable commutator connection may be used. The bobbins are connected in a closed series, as well understood. The field-poles are supposed to be presented at the sides of the armatures shown, although the invention is not restricted to this style of machine.

In Fig. II the joint C is between an inner bobbin D, which is wound the full width of the bobbin-space 2, and an outer bobbin D', which is wound on said bobbin D.

In Fig. III the joint C is between the bobbins of a close-wound (Gramme type) armature, the coils being exhibited as spaced apart for the sake of clearer illustration.

Having fully described my invention, what I claim as new, and desire to secure by Letters Patent, is—

1. A toothed armature for a dynamo-electrical machine, having two, at least, bobbins to a bobbin-space and provided with a branch conductor for a commutator connection united at an intermediate place to the bobbin-wire by a flat-lying joint which leaves the bobbin-wire practically continuous for winding, substantially as described.

2. An armature for a dynamo-electrical machine, provided with a branch conductor for a commutator connection united to the bobbin-wire by a flat-lying joint which leaves the bobbin-wire practically continuous for winding, substantially as described.

3. An armature for a dynamo-electrical machine, provided with branch conductors for commutator connections united to the bobbin-wire by soldered joints formed each of bared portions of the bobbin-wire and branch conductor, a split conducting-sleeve, and a wrapping of tape or non-conducting and binding material, substantially as described.

4. The joint for electric conductors, formed of bared portions of the wires inclosed in a split conducting-sleeve soldered on and wrapped with tape or non-conducting and binding material, substantially as described.

In testimony whereof I have signed this specification in the presence of two subscribing witnesses.

SIDNEY H. SHORT.

Witnesses:
JOHN C. DOLPH,
J. H. GIBSON.